United States Patent
Purslow et al.

(10) Patent No.: US 9,035,221 B2
(45) Date of Patent: May 19, 2015

(54) TANDEM GAS METAL ARC WELDING SYSTEM

(75) Inventors: Marc A. Purslow, Columbus, OH (US); Jeff Root, Columbus, OH (US); Bradley A. Nagy, Columbus, OH (US); Victor M. Penrod, Columbus, OH (US)

(73) Assignee: EDISON WELDING INSTITUTE, INC., Columbus, OH (US)

( * ) Notice: Subject to any disclaimer, the term of this patent is extended or adjusted under 35 U.S.C. 154(b) by 665 days.

(21) Appl. No.: 13/233,366

(22) Filed: Sep. 15, 2011

(65) Prior Publication Data

US 2012/0061364 A1 Mar. 15, 2012

Related U.S. Application Data

(60) Provisional application No. 61/382,971, filed on Sep. 15, 2010.

(51) Int. Cl.
*B23K 9/10* (2006.01)
*B23K 9/12* (2006.01)
*B23K 9/173* (2006.01)

(52) U.S. Cl.
CPC .............. *B23K 9/1735* (2013.01); *B23K 9/123* (2013.01)

(58) Field of Classification Search
USPC ................................................. 219/136–144
See application file for complete search history.

(56) References Cited

U.S. PATENT DOCUMENTS

| | | | |
|---|---|---|---|
| 2,583,507 A * | 1/1952 | Carpenter et al. | 219/137.71 |
| 2,813,190 A * | 11/1957 | Felmley, Jr. | 219/76.14 |
| 2,868,951 A | 1/1959 | Shrubsall | |
| 3,123,702 A | 3/1964 | Keidel et al. | |
| 3,260,834 A | 7/1966 | Arnoldy | |
| 3,396,263 A * | 8/1968 | Even et al. | 219/127 |
| 3,497,667 A | 2/1970 | Howlett et al. | |
| 3,992,603 A | 11/1976 | Reynolds | |
| 4,047,656 A | 9/1977 | McCombs | |
| 4,074,105 A | 2/1978 | Minehisa et al. | |
| 4,289,950 A | 9/1981 | Griebeler | |
| 4,419,563 A | 12/1983 | Nomura et al. | |
| 4,517,438 A * | 5/1985 | Sugitani et al. | 219/125.12 |
| 4,760,241 A | 7/1988 | Sugitani et al. | |
| 4,891,493 A | 1/1990 | Sato et al. | |
| 4,891,494 A | 1/1990 | Baujat | |

(Continued)

OTHER PUBLICATIONS

Iwata Shinji et al., Application of Narrow Gap Welding Process with High Speed Rotating Arc to Box Column Joints of Heavy Thick Plates, JFE Technical Report, No. 14, Dec. 2009.

(Continued)

*Primary Examiner* — Sang Y Paik
(74) *Attorney, Agent, or Firm* — McNees, Wallace & Nurick, LLC (57) ABSTRACT

A gas metal arc welding system that includes first and second welding torch assemblies arranged to operate in tandem. The first welding torch assembly further includes a rotable torch body; a contact tip connected to one end of the rotatable torch body, wherein the contact tip further includes an angled passage formed therethrough; a consumable wire electrode passing through the rotating torch body and exiting the contact tip through the offset exit hole; and a source of shielding gas. The second welding torch assembly further includes a non-rotatable torch body; a contact tip connected to one end of the non-rotatable torch body; a consumable wire electrode passing through the non-rotatable torch body and exiting through the contact tip; and a source of shielding gas.

7 Claims, 9 Drawing Sheets

(56) References Cited

U.S. PATENT DOCUMENTS

| | | | |
|---|---|---|---|
| 4,926,023 | A | 5/1990 | Sugitani et al. |
| 6,627,839 | B1 | 9/2003 | Luckowski et al. |
| 2007/0062922 | A1 | 3/2007 | Zamuner |
| 2008/0053978 | A1 | 3/2008 | Peters et al. |
| 2009/0152255 | A1 | 6/2009 | Ma et al. |

OTHER PUBLICATIONS

International Search Report and Written Opinion received in PCT/US2011/051684, mailed Jan. 6, 2012.

* cited by examiner

TANDEM GAS METAL ARC WELDING SYSTEM

CROSS-REFERENCE TO RELATED APPLICATIONS

This patent application claims the benefit of U.S. Provisional Patent Application Ser. No. 61/382,971 filed on Sep. 15, 2010 and entitled "Tandem Gas Metal Arc Welding System," the disclosure of which is hereby incorporated by reference herein in its entirety and made part of the present U.S. utility patent application for all purposes.

BACKGROUND OF THE INVENTION

The described invention relates in general to welding systems and devices, and more specifically to an arc welding system that includes tandem welding torches for use in narrow-groove applications. Gas metal arc welding (GMAW), sometimes referred to by its subtypes metal inert gas (MIG) welding or metal active gas (MAG) welding, is a semi-automatic or automatic arc welding process in which a continuous and consumable wire electrode and a shielding gas are fed through a welding apparatus. GMAW produces high-quality welds and yields high productivity in many applications. In GMAW, the welding heat source is an arc maintained between the consumable wire electrode and the workpiece. The weld is formed by melting and solidification of the joint edges together with filler material transferred from the electrode. The positive (+) lead is connected to the torch and the negative (−) lead is connected to the work piece for providing a relatively consistent voltage to the arc. Arc voltage is the voltage between the end of the wire and the work piece. The purpose of shielding gas is to protect the weld area from the contaminants in the atmosphere and the gas can be inert, reactive, or mixtures of both. Argon, helium, and carbon dioxide are the main three gases used in GMAW. GMAW process variables include welding current (electrode melting rate), polarity, arc voltage (length), travel speed, electrode extension, electrode size, and shielding gas composition.

Many manufacturers of thick-section components such as pressure vessels, heavy equipment, ship hulls, thick-wall pipe, and the like join parts together using high-deposition-rate welding processes such as GMAW and/or Submerged Arc Welding (SAW) with conventional open-groove designs. Although these processes may be considered to be high-deposition-rate processes, they are not necessarily high-productivity processes for this application due to the large number of welds that are required to fill conventional open-groove weld joints. Other manufacturers of these components join parts by using low-deposition-rate welding processes such as gas tungsten arc welding (GTAW) with narrow-groove designs. Although the narrow-groove design drastically reduces overall volume of the weld joint, the lower deposition-rate processes used with these joint configurations prevent them from being high productivity processes. As the market for these components continuously drives the need to reduce cost while maintaining a high level of quality, innovative methods of joining these components together at much higher productivity levels must be created.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first gas metal arc welding system is provided. This system includes first and second welding torch assemblies arranged to operate in tandem. The first welding torch assembly further includes a rotatable torch body; a contact tip connected to one end of the rotatable torch body, wherein the contact tip further includes an angled passage formed therethrough, and wherein the angled passage defines an exit hole in one of the end of the contact tip that is offset from the central axis of the contact tip; a consumable wire electrode passing through the rotating torch body and the contact tip and exiting the contact tip through the offset exit hole; and a source of shielding gas located in close proximity to the portion of the electrode exiting the contact tip. The second welding torch assembly further includes a non-rotatable torch body; a contact tip connected to one end of the non-rotatable torch body; a consumable wire electrode passing through the non-rotatable torch body and the contact tip and exiting the contact tip; and a source of shielding gas located in close proximity to the portion of the electrode exiting the contact tip.

In accordance with another aspect of the present invention, a second gas metal arc welding system is provided. This system includes first and second welding torch assemblies arranged to operate in tandem. The first welding torch assembly further includes a fluid-cooled rotable torch body; a contact tip connected to one end of the rotatable torch body, wherein the contact tip further includes an angled passage formed therethrough, and wherein the angled passage defines an exit hole in one of the end of the contact tip that is offset from the central axis of the contact tip; a consumable wire electrode passing through the rotating torch body and the contact tip and exiting the contact tip through the offset exit hole; and an apparatus for providing at least one shielding gas located in close proximity to the portion of the electrode exiting the contact tip. The second welding torch assembly further includes a fluid-cooled non-rotatable torch body; a contact tip connected to one end of the non-rotatable torch body; a consumable wire electrode passing through the non-rotatable torch body and the contact tip and exiting the contact tip; and an apparatus for providing at least one shielding gas located in close proximity to the portion of the electrode exiting the contact tip.

In yet another aspect of this invention, a third gas metal arc welding system is provided. This system includes first and second welding torch assemblies arranged to operate in tandem. The first welding torch assembly further includes a fluid-cooled rotatable torch body; a contact tip connected to one end of the rotatable torch body, wherein the contact tip further includes an angled passage formed therethrough, and wherein the angled passage defines an exit hole in one of the end of the contact tip that is offset from the central axis of the contact tip; a consumable wire electrode passing through the rotating torch body and the contact tip and exiting the contact tip through the offset exit hole; and an apparatus for providing at least one shielding gas located in close proximity to the portion of the electrode exiting the contact tip, wherein the apparatus further includes multiple gas delivery tubes each terminating in a gas delivery nozzle. The second welding torch assembly further includes a fluid-cooled non-rotatable torch body; a contact tip connected to one end of the non-rotatable torch body; a consumable wire electrode passing through the non-rotatable torch body and the contact tip and exiting the contact tip; and an apparatus for providing at least one shielding gas located in close proximity to the portion of the electrode exiting the contact tip, wherein the apparatus further includes multiple gas delivery tubes each terminating in a gas delivery nozzle.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DESCRIPTION OF THE INVENTION

Exemplary embodiments of the present invention are now described with reference to the Figures. Although the following detailed description contains many specifics for purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

This invention addresses the market need for increased productivity in thick-section welding applications, such as pressure vessels, heavy equipment, ship hulls, heavy-wall pipe, and other thick-plate structures. This invention allows the production of high-quality welds at much higher productivity levels than can be achieved with either high deposition rate processes using conventional open-groove designs, or conventional narrow-groove gas tungsten arc welding (NG-GTAW). The use of a narrow-groove joint configuration can also reduce distortion and residual stress in the completed weldment. In general terms, the present invention provides a narrow-groove tandem gas metal arc welding system having two electrodes arranged in a "lead" and "trail" configuration capable of creating a high-frequency weave. This invention may also be referred to as narrow-groove tandem GMAW with oscillating lead arc welding. Gas-delivery nozzles provide shielding of the molten weld. The system is designed for use in narrow-groove joints up to about 6 inches thick; however modifications can be made to adapt the torch to thicker joints. Adjustments can be made to the horizontal spacing between the electrodes, the relative height of the contact tips, and the included angle between the electrodes. By properly adjusting the horizontal spacing between the electrodes and using the spin-arc capability of the lead torch to produce a high frequency weave, stable arcs, smooth puddle flow, and excellent sidewall fusion can be achieved. With reference now to the Figures, one or more specific embodiments of this invention shall be described in greater detail.

As shown in FIGS. 1-9, tandem gas metal arc welding system 100 includes first torch assembly 120 and second torch assembly 220, which further include lead torch 121 and trailing torch 221, respectively. When system 100 is in operation, lead torch 121 rotates at a high rate of speed. Lead torch drive motor 122 is mechanically coupled to lead torch 121 by belt 124, the tension of which may be adjusted by belt tensioner 126 and adjustment knobs 127. Power is provided to lead torch 121 by power rotary union 128, which includes positive terminal 129, to which positive lead 112 is connected. Wire conduit 114 enters the top portion of power rotary union 128 and provides the pathway through which the consumable wire electrode enters lead torch 121. Fluid (e.g., water) rotary union 130 is positioned beneath power rotary union 128 and includes fluid inlet 132 and fluid outlet 134. Mounting block 119 supports power rotary union 128 and fluid rotary union 130.

Figure 5:
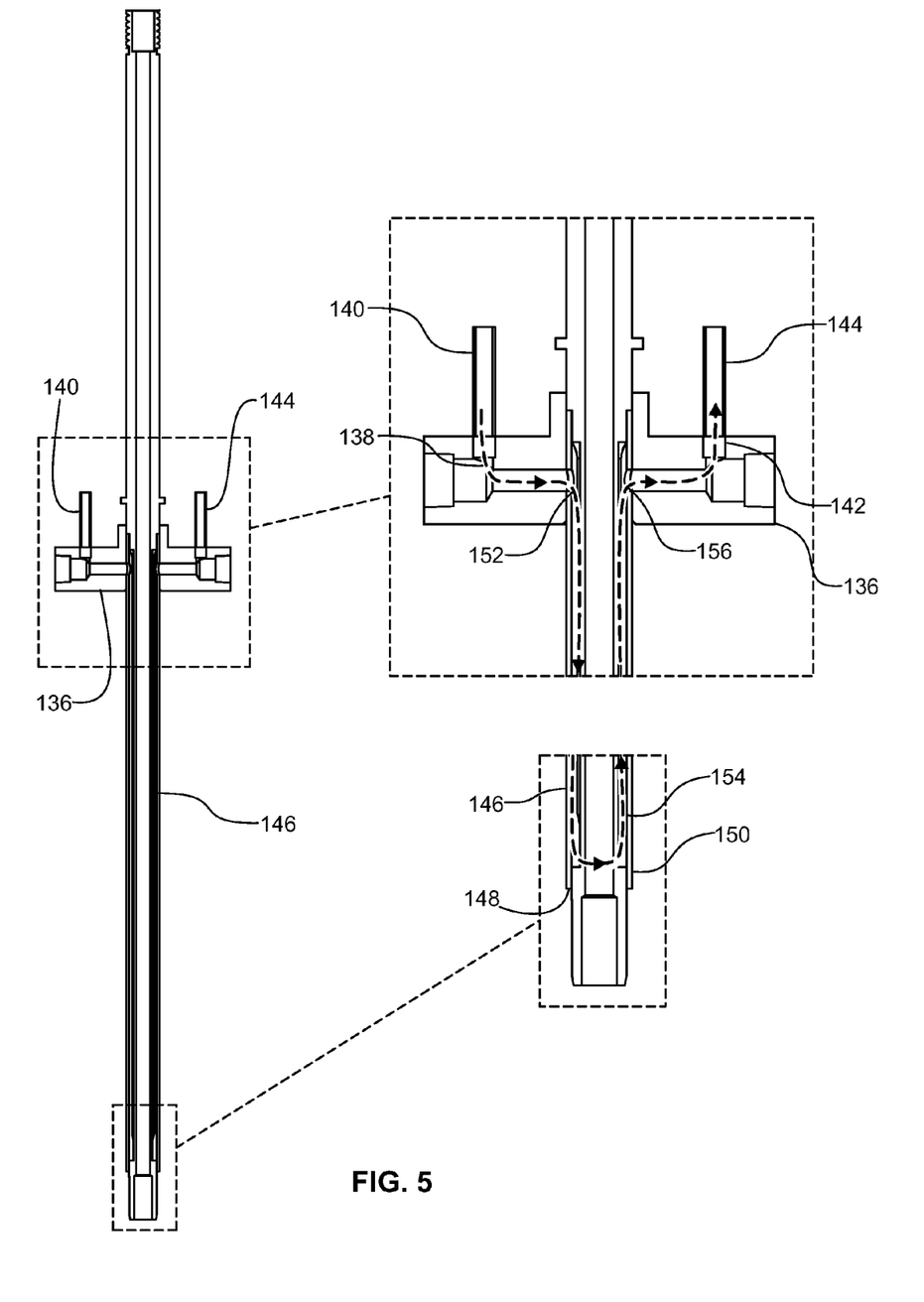
FIG. 5 includes a side view of the water-cooled lead-torch contact tube as well as multiple cross-sectional views of the construction of the interior of the water-cooled lead-torch contact tube of the tandem gas metal arc welding system of FIG. 1.

The topmost portion of contact tube 146 is connected to rotary power union 128. The center portion of contact tube 146 is connected to the bottom portion of rotary fluid union 130, where it is rotated by belt 124 (see FIGS. 3-4). In the embodiments of the present invention described herein, contact tube 146 is adapted to receive cooling (e.g., water) fluid introduced into the system through fluid inlet 132. As best shown in FIG. 5, manifold block 136, which may be copper or another suitable metal, is welded or otherwise attached to contact tube 146 and includes fluid inlet 138 into which tube 140 is inserted and secured for providing a fluid path from fluid inlet 132 in fluid rotary union 130. Compression fitting 141 is used to connect tube 140 to the bottom portion of fluid rotary union 130 (see FIG. 4). Fluid inlet 138 is in fluid communication with fluid inlet 152, which is formed in lead torch contact tube 146. Cooling fluid flows into contact tube 146 at inlet 152 and passes through internal conduit 154 and exits contact tube 146 at fluid outlet 156. Fluid exiting contact tube 146 passes through fluid outlet 142 in manifold block 136, through tube 144 and ultimately out of fluid rotary union 130 through outlet 134. Compression fitting 145 is used to connect tube 144 to the bottom portion of fluid rotary union 130 (see FIG. 4). Lead-torch contact tube 146 is constructed by machining channels into a section of extruded copper and sliding a section of copper tubing over the machined section to create fluid passages. The copper tubing is welded circumferentially and additional fittings are brazed in place. As shown in FIG. 5, internal conduit 154 is formed by sliding outer portion 150 over inner portion 148, which has been machined to include a channel. The introduction of water or other cooling fluid into contact tube 146 ultimately results in higher weld material deposition rates.

Figure 6A:
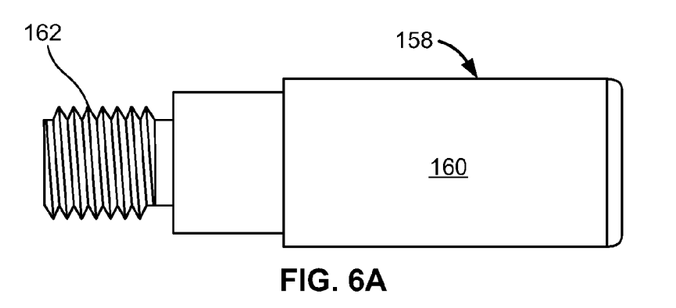
FIGS. 6A-D are side, cross-sectional, rear, and front views respectively of the lead electrode contact tip of the tandem gas metal arc welding system of FIG. 1.
Figure 6B:
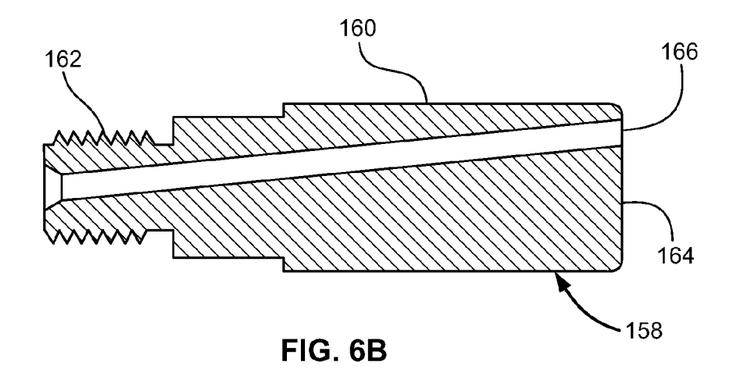
Figure 6C:
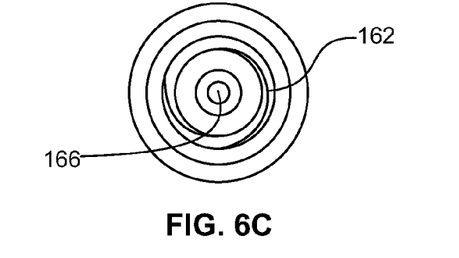
Figure 6D:
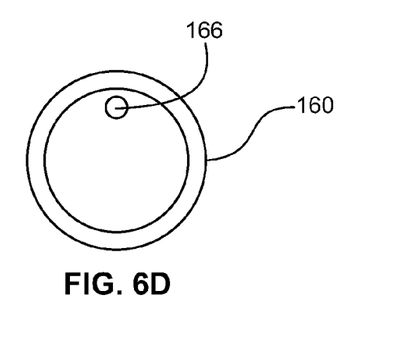

As shown in FIGS. 6A-D, contact tip 158 is the portion of lead torch 121 through which lead electrode 159 exits and interacts with a workpiece. In this exemplary embodiment, contact tip 158 includes cylindrical body 160 which has a threaded rear portion 162 and a flattened front portion 164. As shown in FIG. 6B, an angled bore is formed through cylindrical body 160, thereby creating an exit point for lead electrode 159 that is offset from the central axis of contact tip 158 (see FIG. 6D). This offset exit point allows lead electrode 159 to oscillate when lead torch 121 is rotated at a high rate of speed, thereby creating a weave pattern in the weld area. As will be appreciated by one of ordinary skill in the art, alternate mechanical or structural means for inducing desired oscillation in lead electrode 159 are possible and these alternate means are contemplated by and considered part of this invention.

Figure 7:
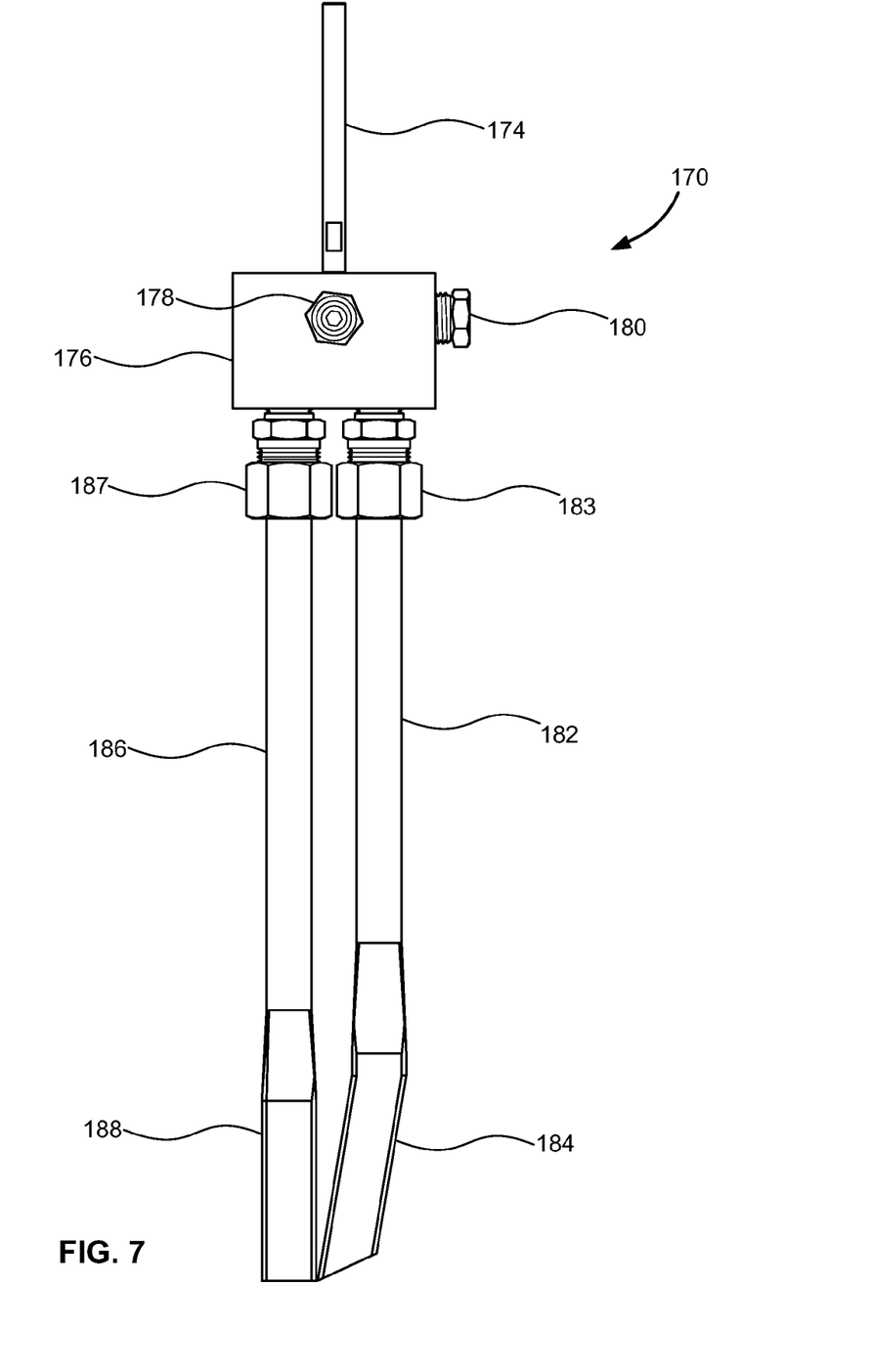
FIG. 7 is a front view of the lead torch gas delivery assembly of the tandem gas metal arc welding system of FIG. 1.

As previously indicated, the GMAW process includes at least one shielding gas for protecting the weld area from the contaminants in the atmosphere. As best shown in FIG. 7, lead torch gas delivery assembly 170 includes support 172 and an electrical isolation sleeve 174 which is connected to manifold block 176. Gas hose fitting 178 is connected to a gas line (not shown) and plug 180 is inserted into manifold block 176. Compression fitting 183 is used to connect first lead gas delivery tube 182 to manifold block 176 and first lead gas delivery nozzle 184 is connected to or formed integrally with one end of first lead gas delivery tube 182. Compression fitting 187 is used to connect second lead gas delivery tube 186 to manifold block 176 and second lead gas delivery nozzle 188 is connected to or formed integrally with one end of second lead gas delivery tube 186. Alternate configurations of gas delivery assembly 170 are possible with regard to the placement and geometry of the delivery tubes and nozzles as well as the other components of the assembly (see FIG. 3).

Figure 1:
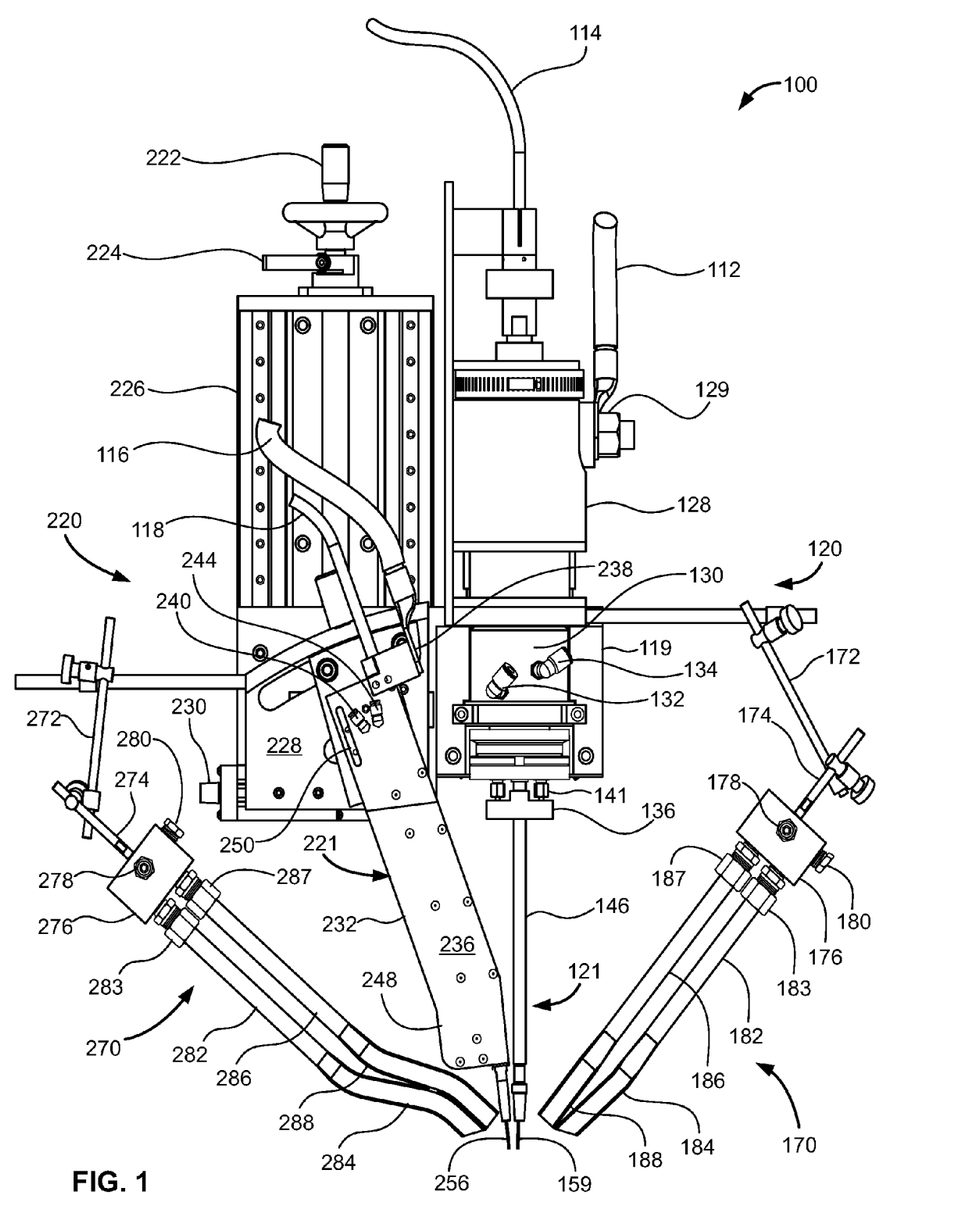
FIG. 1 is a front view of an exemplary embodiment of the tandem gas metal arc welding system of the present invention.
Figure 2:
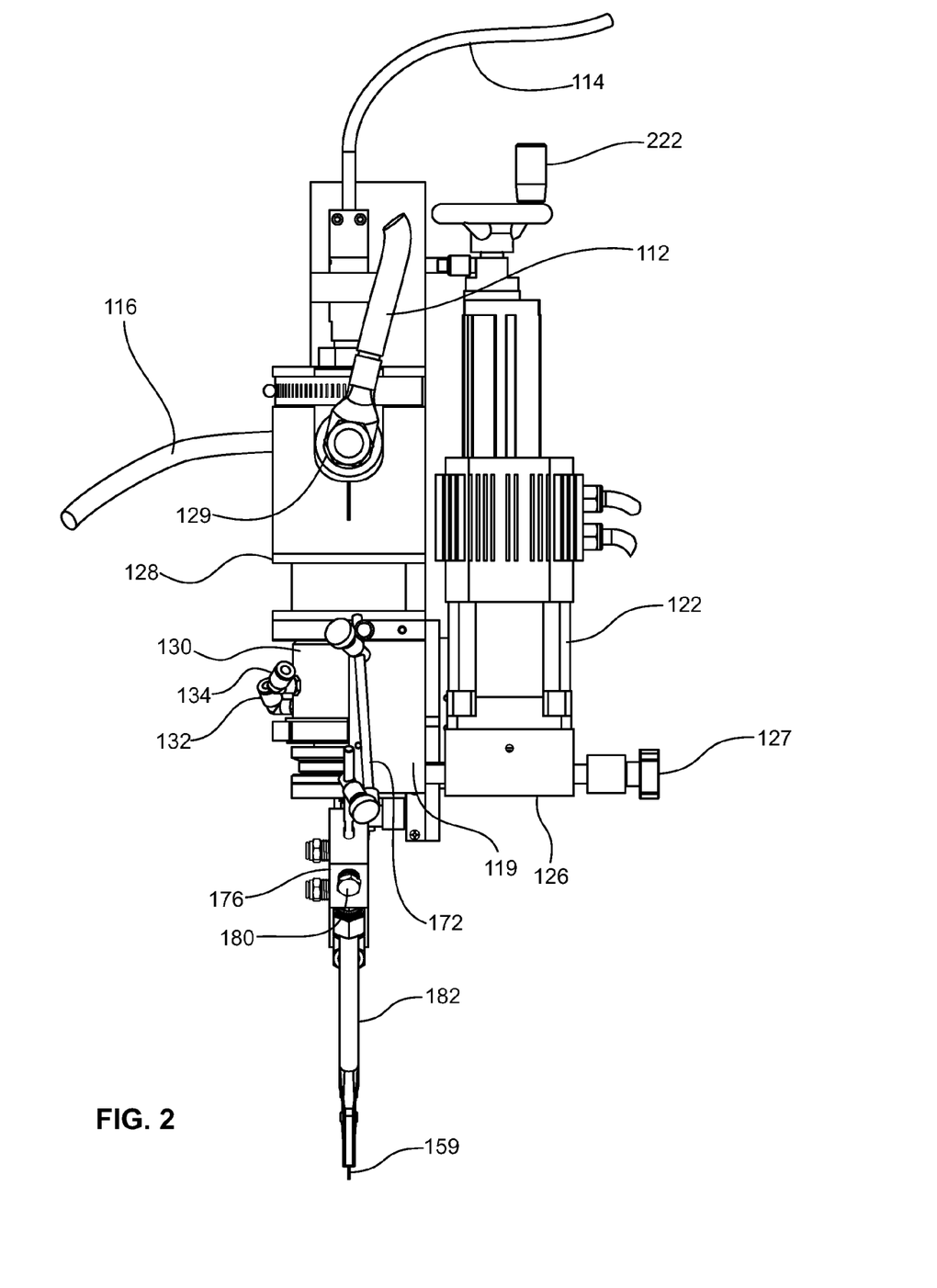
FIG. 2 is a side view of the tandem gas metal arc welding system of FIG. 1.
Figure 3:
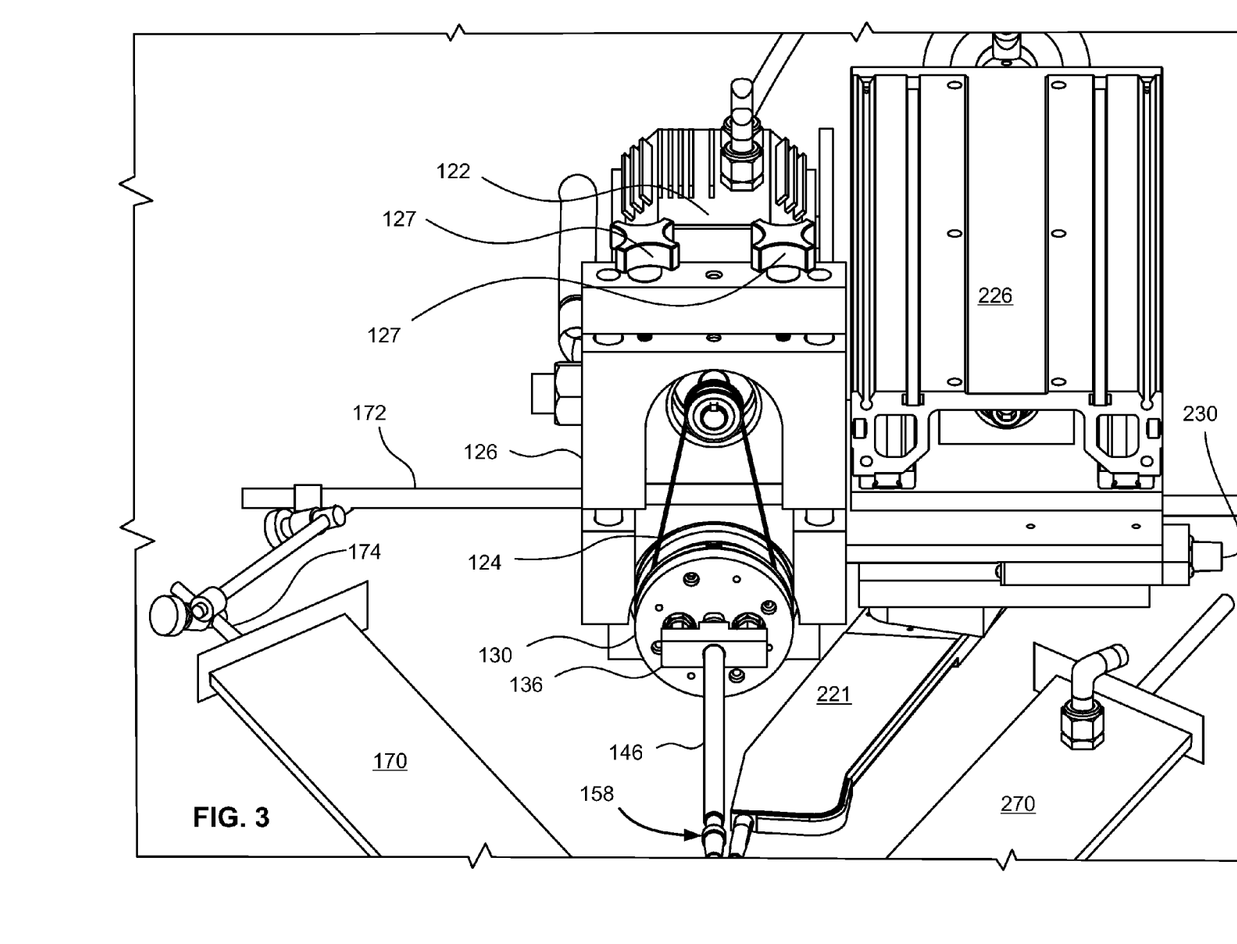
FIG. 3 is a bottom view of a portion of an alternate embodiment of the tandem gas metal arc welding system of the present invention showing the lead torch drive mechanism in greater detail.
Figure 4:
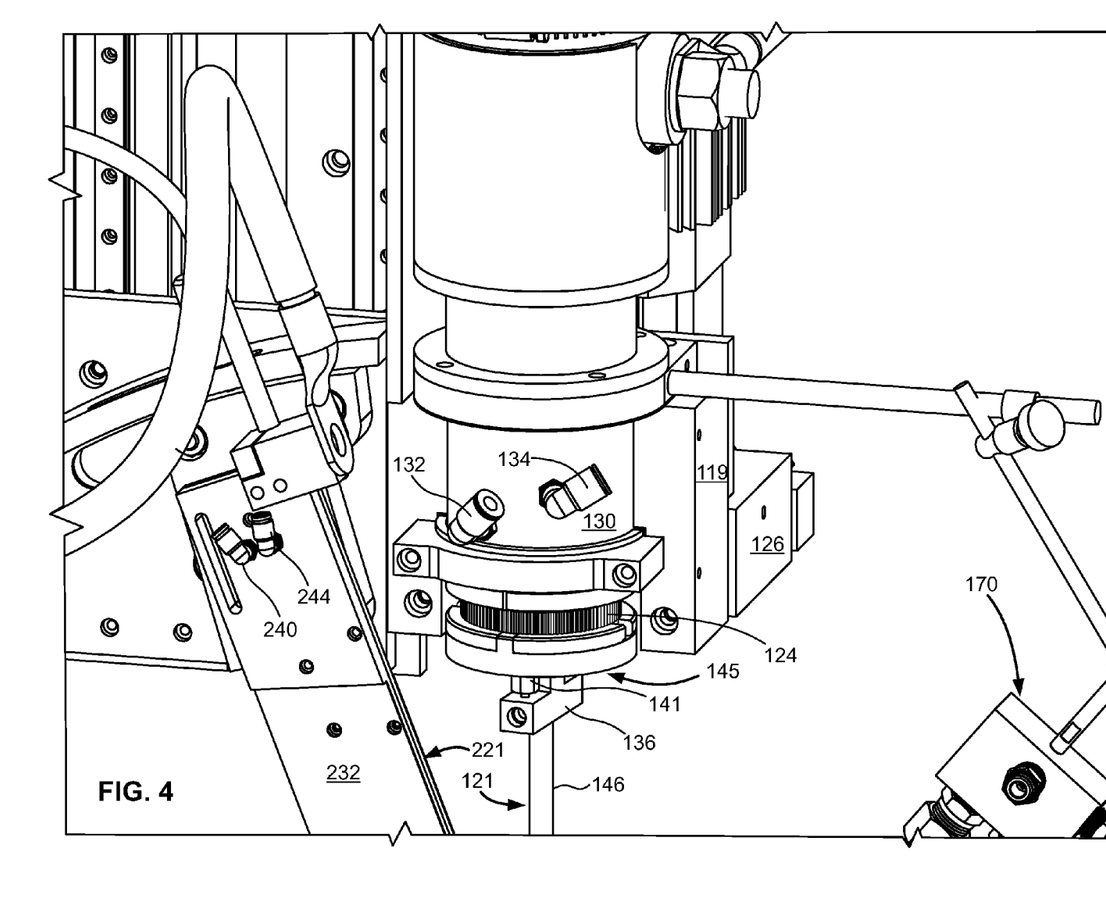
FIG. 4 is a front view of a portion of the tandem gas metal arc welding system of FIG. 1 showing the water rotary union and drive belt in greater detail.
Figure 8:
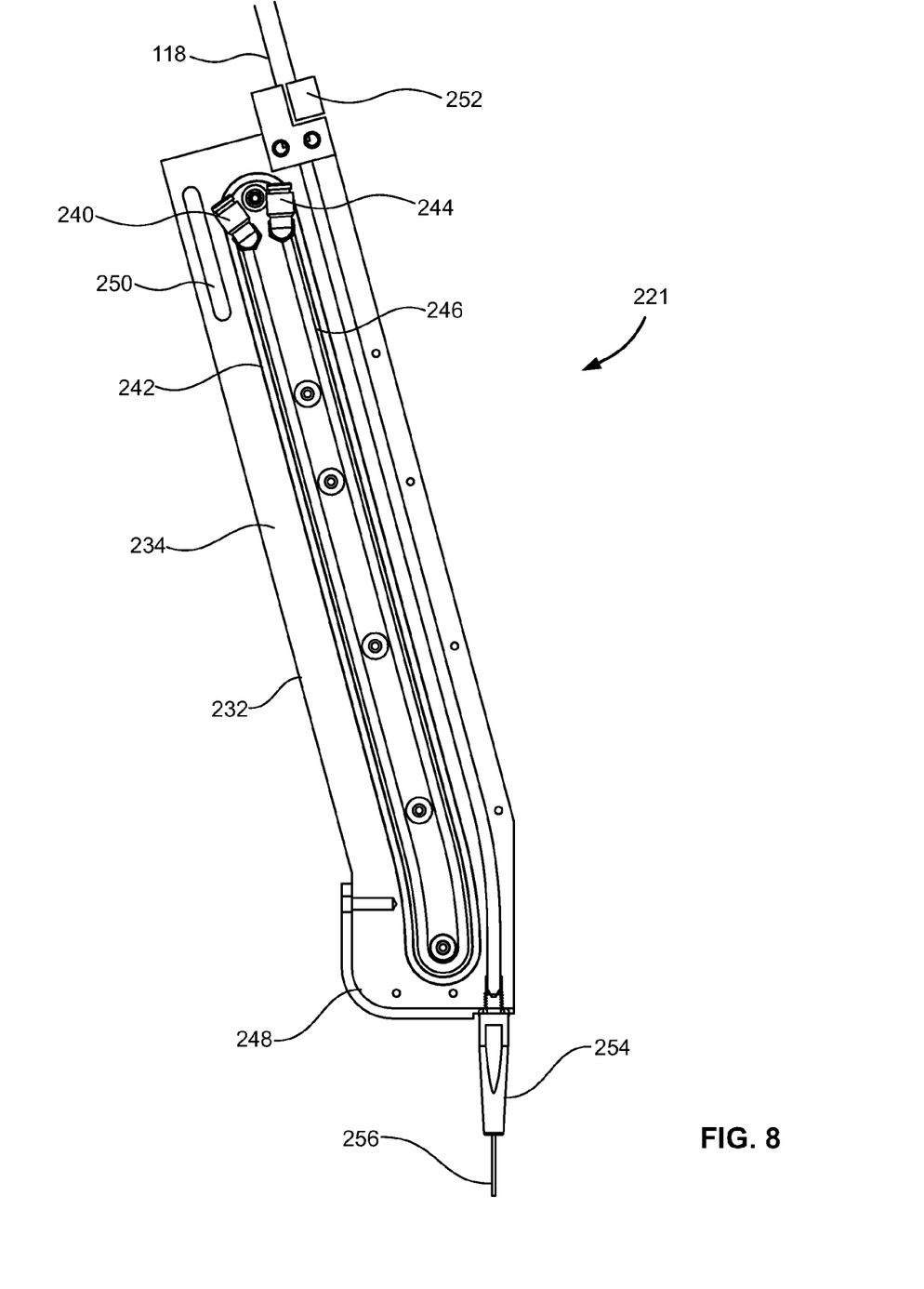
FIG. 8 is a front view of the trailing torch of the tandem gas metal arc welding system of FIG. 1 shown with the top portion removed such that the construction of the interior of the trailing torch is visible.

The GMAW system of the present invention includes two welding torches, the first of which has been previously described. As best shown in FIGS. 1 and 8, trailing torch assembly 220 includes trailing torch 221, which trails or follows lead torch 121 through a weld area. In the exemplary embodiment shown in the Figures, torch height adjustment knob 222, torch height adjustment lock 224, torch height adjustment slide 226, torch height adjustment mechanism 228, and wire spacing adjustment knob 230 permit the position of trailing torch 221 to be changed or adjusted relative to the position of lead torch 121. An important parameter with regard to this system is the spacing of wire electrodes 159 and 256. A preferred spacing is about 4 to 8 mm as measured at the end of the wire electrodes at a contact-tip-to-work distance of 19 mm. Trailing torch 221 includes a fluid cooled torch body 232 that further includes bottom portion 234 and top portion 236 as well as positive terminal 238 to which positive lead 116 is attached. Wire conduit 118 enters the top portion of torch body 232 and provides the pathway through which the consumable wire electrode enters trailing torch 221. Clamp 252 is used to connect conduit 118 to torch body 232. Top portion 236 includes fluid inlet 240 and fluid outlet 244, while bottom portion 234 includes fluid passage or channel 242 formed therein. O-ring 246 is provided to seal the connection between bottom portion 234 and top portion 236. Torch body 232 further includes spatter guard 248 and slot for vertical adjustment 250. Contact tip 254 is attached to the bottom of torch body 232 and trailing electrode 256 extends therefrom.

Figure 9:
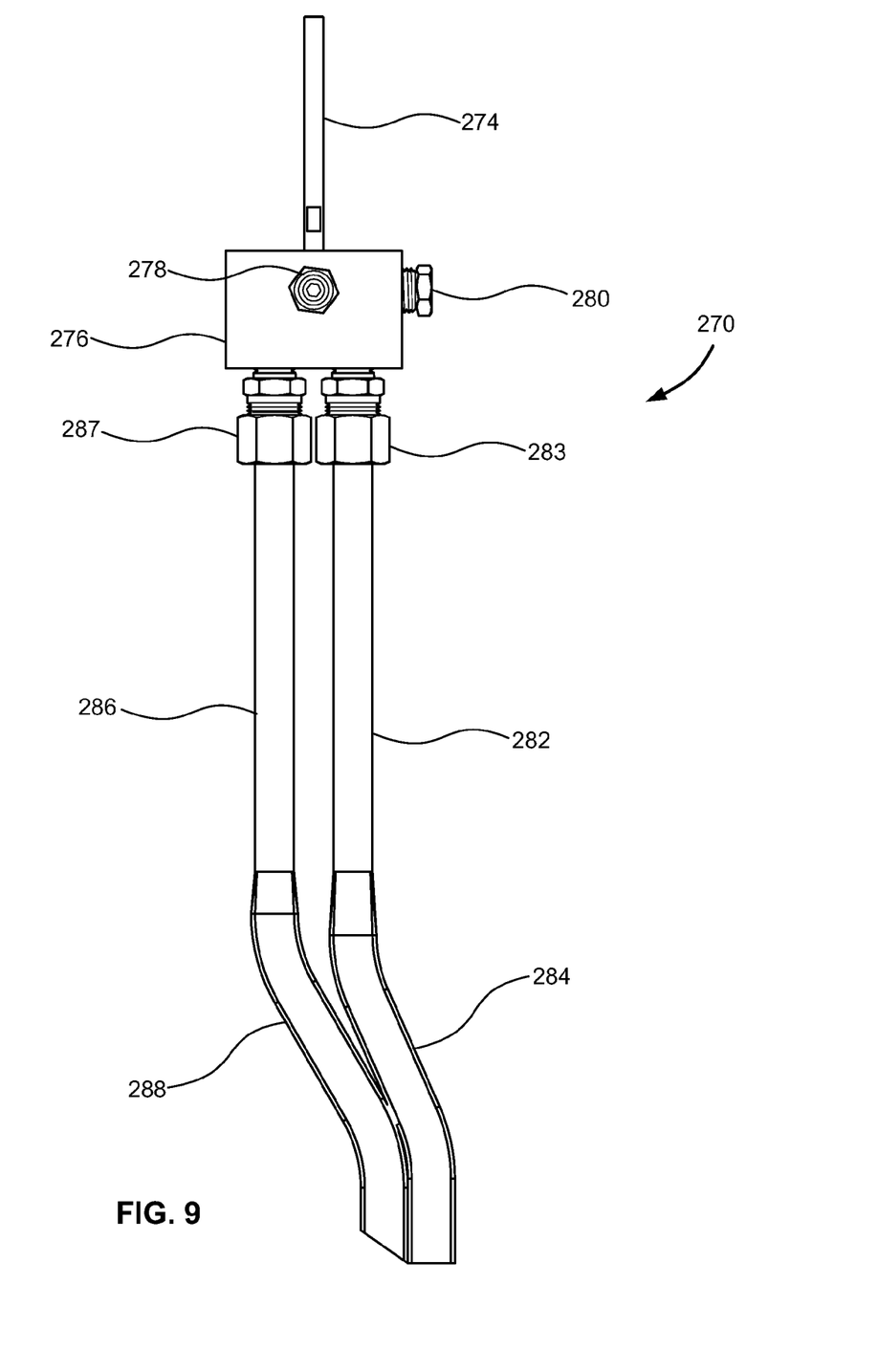
FIG. 9 is a front view of the trailing torch gas delivery assembly of the tandem gas metal arc welding system of FIG. 1.

As previously indicated, the GMAW process includes at least one shielding gas for protecting the weld area from the contaminants in the atmosphere. As best shown in FIG. 9, trailing torch gas delivery assembly 270 includes support 272 and an electrical isolation sleeve 274 which is connected to manifold block 276. Gas hose fitting 278 is connected to a gas line (not shown) and plug 280 is inserted into manifold block 276. Compression fitting 283 is used to connect first trailing gas delivery tube 282 to manifold block 276 and first trailing gas delivery nozzle 284 is connected to or formed integrally with one end of first trailing gas delivery tube 282. Compression fitting 287 is used to connect second trailing gas delivery tube 286 to manifold block 276 and second trailing gas delivery nozzle 288 is connected to or formed integrally with one end of second trailing gas delivery tube 286. Alternate configurations of gas delivery assembly 270 are possible with regard to the placement and geometry of the delivery tubes and nozzles as well as the other components of the assembly (see FIG. 3).

As previously indicated, by using a contact tip with an offset exit hole, a circular oscillating motion is created. The present invention includes two exemplary versions of these specialized tips; one with a 1.5 mm diameter of rotation as measured at the center of the wire at a 19 mm contact tip to work distance and one with a 2.5 mm diameter of rotation. The addition of rotation in the lead arc results in improved sidewall wetting and penetration. Furthermore, larger gaps can be welded when rotating the lead electrode. While rotating the 1.5 mm tip resulted in improved gap-bridging over the non-rotated lead electrode, trials also revealed a further improvement to gap-bridging by using the 2.5 mm tip. Preliminary trials with the non-rotating lead electrode resulted in lack-of-fusion defects at a gap of 16 mm. Welds made with a rotating 2.5 mm tip and a 16 mm gap had good sidewall fusion, consistent bead profiles, and improved bead surface appearance. Welds made with the rotating lead electrode also appeared to be less affected by misalignment of the torch in the welding joint and were less affected by wire cast. Preferred welding parameters include: (i) lead wire feed speed: 450 ipm; (ii) lead voltage: 25-27 Volts; (iii) trail wire feed speed: 350 ipm; (iv) trail voltage: 27-29 Volts; (v) travel speed: 12-15 ipm; (vi) speed of rotation: 400-600 rpm; (vii) wire spacing: about 5-7 mm; (viii) contact tip-to-work distance: 19 mm (both electrodes); (ix) welding mode: synchronized pulsed lead/pulsed trail; and (x) joint preparation: 0.5-inch narrow groove with a 2 degree included angle.

The present invention combines the high deposition rates of consumable electrode processes, further increased by the addition of a second arc, and the drastically reduced joint volume of narrow groove joint designs to drastically improve productivity. The addition of a second arc allows increased travel speeds and deposition rates resulting in 75 to 100% increases in productivity over single-wire narrow-groove GMAW with a rotating electrode. The rotation of the lead arc as well as the addition of the trailing arc improves sidewall fusion and wetting. Issues with lack of sidewall penetration and fusion that have typically hindered the use of high deposition-rate GMAW in narrow grooves have been solved by the use of an oscillating lead arc while productivity has been significantly increased by the addition of a second electrode contributing to the same weld pool. Another benefit of tandem GMAW is a reduction in calculated heat input when compared to single-wire arc welding processes when operated at the same deposition rate. This results from the use of two separate consumable electrodes which require less energy to melt than a single electrode. If using a single electrode, a higher wire feed speed or a larger diameter electrode is required to achieve the same deposition rate as tandem GMAW, resulting in a higher current and a higher heat input. This is significant because heat input has a direct correlation to the mechanical properties of a completed weldment in certain materials. Better contact tip life is achieved by fluid cooling of the contact tip.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A tandem gas metal arc welding system, comprising:
   (a) a leading welding torch assembly, where in the leading welding torch assembly further comprises:
      (i) a fluid-cooled rotatable first torch body, wherein the rotatable first torch body further includes at least one cooling channel formed therein;
      (ii) a first contact tip connected to one end of the rotatable first torch body, wherein the first contact tip further includes an angled passage formed therethrough, and wherein the angled passage defines an exit hole in one of the end of the first contact tip that is offset from the central axis of the contact tip;
      (iii) a first consumable wire electrode passing through the rotating first torch body and the first contact tip and exiting the first contact tip through the offset exit hole; and
      (iv) a first apparatus for providing at least one shielding gas located in close proximity to the portion of the electrode exiting the first contact tip, wherein the first apparatus for providing at least one shielding gas further includes two gas delivery tubes positioned parallel to one another, each terminating in a gas delivery nozzle positioned in close proximity to the terminus of the first wire electrode; and
   (b) a trailing welding torch assembly, where in the trailing welding torch assembly further comprises:
      (i) a fluid-cooled non-rotatable second torch body, wherein the second torch body further includes a flattened, elongated body containing internal fluid passages and a spatter guard formed one end thereof;
      (ii) a second contact tip connected to one end of the non-rotatable second torch body;
      (iii) a second consumable wire electrode passing through the non-rotatable second torch body and the second contact tip and exiting the second contact tip; and
      (iv) an second apparatus for providing at least one shielding gas located in close proximity to the portion of the electrode exiting the second contact tip, wherein the second apparatus for providing at least one shielding gas further includes two gas delivery tubes positioned parallel to one another, each terminating in a gas delivery nozzle positioned in close proximity to the terminus of the second wire electrode;
   (c) an adjustment mechanism for adjusting the height of the non-rotatable second torch body relative to the rotatable first torch body and for adjusting the horizontal distance between the operative tips of the two consumable wire electrodes; and
   (d) wherein the tandem gas metal arc welding system is adapted for use in narrow-groove joints of up to about six inches in thickness.

2. The system of claim 1, further comprising a drive motor mechanically coupled to the rotatable torch body for rotating the torch body at a high rate of speed.

3. The system of claim 1, further comprising a rotary union for providing power to the rotatable torch body.

4. The system of claim 1, further comprising a fluid rotary union for providing cooling fluid to the rotatable torch body and a manifold disposed between the fluid rotary union and the rotatable torch body, where in the manifold further includes at least one fluid inlet and at least one fluid outlet.

5. The system of claim 1, wherein the distance between the tips of the two electrodes is about 5-7 mm.

6. The system of claim 1, wherein the first electrode is capable of oscillation, and wherein this oscillation is operative to produce a high-frequency weave within a weldment created by the system.

7. The system of claim 1, wherein the first electrode capable of oscillation, and wherein positioning the first electrode at a predetermined horizontal distance from the second electrode and utilizing the oscillation capability of the first electrode is operative to produce a high-frequency weave within a weldment created by the system.

* * * * *